United States Patent [19]

Wakelin

[11] Patent Number: 4,634,001

[45] Date of Patent: Jan. 6, 1987

[54] BOX FOR HOLDING THIN OBJECTS

[76] Inventor: Thomas C. V. Wakelin, Bramcote 1, Norris Close, Firgrove Road, Whitehill, Hampshire GU32 9EG, United Kingdom

[21] Appl. No.: 613,155

[22] Filed: May 23, 1984

[30] Foreign Application Priority Data

Jun. 1, 1983 [GB] United Kingdom ............... 8315041
Mar. 27, 1984 [GB] United Kingdom ............... 8407936

[51] Int. Cl.⁴ ............................................. B65D 5/50
[52] U.S. Cl. ........................... 206/45.18; 206/45.15; 206/45.2; 206/45.23; 206/425; 206/444; 206/555
[58] Field of Search ............... 206/45.14, 45.15, 45.18, 206/45.2, 45.23, 45.24, 387, 449, 555, 425, 444; 220/334, 338

[56] References Cited

U.S. PATENT DOCUMENTS

| 2,241,989 | 5/1941 | Friedrich et al. | 206/45.23 |
| 2,660,294 | 11/1953 | Young | 206/45.2 |
| 3,360,116 | 12/1967 | Somers et al. | 206/45.2 |
| 3,783,999 | 1/1974 | Smith | 206/45.23 |
| 4,102,452 | 7/1978 | Sato et al. | 206/387 |
| 4,356,918 | 11/1982 | Kahle et al. | |
| 4,369,879 | 1/1983 | Egly et al. | 206/45.18 |
| 4,420,079 | 12/1983 | Gliniorz et al. | 206/45.23 |
| 4,508,217 | 4/1985 | Long et al. | 206/45.18 |

FOREIGN PATENT DOCUMENTS

| 50639 | 11/1911 | Austria | 206/45.23 |
| 66273 | 5/1982 | European Pat. Off. | |
| 2609881 | 9/1977 | Fed. Rep. of Germany | |
| 2917806 | 11/1980 | Fed. Rep. of Germany | |
| 3006864 | 9/1981 | Fed. Rep. of Germany | |
| 3114333 | 11/1982 | Fed. Rep. of Germany | |
| 580410 | 9/1946 | United Kingdom | |

Primary Examiner—Joseph Man-Fu Moy
Assistant Examiner—David Fidei
Attorney, Agent, or Firm—Robert H. Ware; Melvin I. Stoltz; Alfred A. Fressola

[57] ABSTRACT

A box, particularly for holding floppy discs, has an outer sleeve enclosing a drawer. The drawer can be withdrawn partially from the sleeve to a position where pins molded inside the sleeve and sliding in grooves in the sleeve limit the withdrawal. The drawer and sleeve can then be swung with respect to each other and the drawer moved back on itself. The open box is self-supporting in this invert-V configuration.

39 Claims, 10 Drawing Figures

BOX FOR HOLDING THIN OBJECTS

BACKGROUND OF THE INVENTION

The present invention relates to a box, particularly though not exclusively, for holding magnetic discs of the type known as "floppy" discs.

Various boxes and containers are available for floppy discs. In particular a recently available box is in the form of a rectangular tubular sleeve. This box is provided with complementary dovetail formations on opposite sides of its sleeve whereby a plurality of boxes can be stacked side by side, or one above the next, in such a manner that they are interengaged and may be handled as one unit. One of these boxes is opened by pulling a drawer out from the sleeve.

Another floppy disc box is described in U.S. Pat. No. 4,356,918. This box has a "pouch" section hinged at one end to a base section. The pouch section is adapted to retain the floppy discs when upright. The base section can support the pouch section upright but only when the base section has been swung through 180° and the pouch section has been swung through somewhat more than 90°, but from a closed position of the box. This operation involving somewhat over 270° of relative movement requires dexterity to perform. Even when the pouch section is supported upright it must lean slightly back against the base section for stability. If it is inadvertently knocked forwards it can fall flat spilling the floppy discs.

SUMMARY OF THE INVENTION

The present invention has been conceived as a box which is readily opened to a stable, self-supporting position.

A box according to the invention comprises:
a sleeve,
a drawer, slidingly accommodated in the sleeve, and engagement means interconnecting the sleeve and the drawer, the engagement means being such that the drawer is withdrawable at least partially from the sleeve to a position wherein the drawer and the sleeve can be swung with respect to each other through an angle of less than 180°, whilst still interengaged, and the drawer can then be moved back on itself to a position wherein the sleeve and the drawer co-operate to be self-supporting in an inverted V form.

When the box is open, contained objects, typically floppy discs, are displayed in the drawer with the box in its self-supporting, invert-V form. The discs can be readily thumbed through without risk of the opened box becoming unstable and spilling the floppy discs.

Although a respective slot could be provided in each of two opposite side members of the sleeve with a respective pin attached to or even movable in a respective further slot in each of two opposite side members of the drawer, the preferred arrangement for facilitating the "draw-swing-moveback" action is the provision of a respective groove in each side member of the drawer and a respective corresponding pin on the inside surface of each side member of the sleeve.

Preferably the arrangement is such that the distance through which the drawer is moved back after being swung is less than the original drawing distance. This requires provision of a stop to limit the moving back distance. Although this stop could be provided by engagement of the sleeve and drawer elsewhere on the box, the stop is preferably provided alone or additionally by adaption of the pins and/or the grooves for the pins to engage in a stopped manner with the grooves at the required position. In a first embodiment, the adaption is in the form of the grooves being of greater width along the "moving-back" portion thereof. Additionally, the pins are conveniently of an aspect ratio such that they occupy the narrow width of the groove when the sleeve and drawer are aligned for drawing and they occupy substantially the full width of their grooves when the sleeve and drawer are swung for moving-back.

In a second embodiment, each groove in the respective side members of the drawer is hook-shaped, having a long branch occupied by its respective pin during withdrawing of the drawer from the sleeve, a transverse connecting section occupied by its pin during at least part of the swinging of the drawer with respect to the sleeve, and a shorter branch substantially parallel to the long branch and occupied by its pin during moving-back of the drawer.

The shorter branches may be positioned above or below the longer branches, with the drawer oriented base-down. However, in the second embodiment described below with respect to the drawings, the shorter branches are positioned below the longer branches since this enables the drawer and sleeve to be self-supporting with a larger angle between them. By analogy, the wider portion of the equivalent grooves in the box of the first embodiment could have been arranged to step wider at lower edges of the grooves rather than to step wider at the upper edge as shown in my earlier application.

The box is preferably of moulded plastics material. The pins are preferably of squat U-shape. This has the twofold advantage of reducing their moulding-shrinkage-causing bulk and of providing a more certain engagement with the stops formed by the step in width of the grooves as a result of the free corner of the step being accommodated in the gap between the arms of the U, at least in the first embodiment.

A further feature of the box of both embodiments is that the bottom of the sleeve is cut away in the region of the U-shaped pins moulded inside the sides of the sleeve to enable the sides to deflect outwards on springing of the pins into the grooves in the drawer for initial assembly of the box.

The drawer is preferably provided with a restraining member for restraining the contents, usually floppy discs, from falling out forwards when the drawer is on end with the box in its open invert-V form. Although the restraining member could be fixed to the drawer, possibly resiliently, it is preferably movable, conveniently pivotably, to an open position where at least some of the discs are restrained at an angle such as to lean forwards by a few degrees.

In the first embodiment, the forward edge of the restraining member abuts the top of the front of the drawer. In the second embodiment, the restraining member is so pivotally connected to the drawer that in the member's restraining position a forward edge of the restraining member abuts the flat surface. This is of advantage in that the restraining member not only restrains floppy discs displayed in the drawer from falling forwards out of the drawer, but also restrains the entire box from overbalancing forwards. This might otherwise happen with plastics-cased floppy discs, which are heavier than the cardboard-cased discs which the box of the first embodiment was designed to hold.

In the first embodiment, the restraining member may be freely movable to its restraining position. In the second embodiment it is preferably movable against friction whereby it more readily maintains its restraining position. Such friction could be achieved by means of a detent. However, it is preferably achieved by friction between pins engaging the restraining member with slots in the drawer. Preferably the web of the restraining member having the surface engaging edge co-operates with the top forward edge of the drawer in an over-centre manner during movement to its restraining position.

Preferably the said web of the restraining member is abutted on its underside by the said top forward edge of the drawer to transfer load to the restraining member when it is angled forward and acting to restrain. The sides of the restraining member may be cut away to enable such abutment.

The box is preferably provided with a catch arrangement whereby the drawer is held in when closed so that the box can be handled at random orientation without the contents being spilled. Conveniently, the catch is provided by means of an aperture in the sleeve being engaged by a detent on the drawer which is flexible for movement of the detent into its aperture. Where a restraining member is provided, it is conveniently made flexible with the detent provided thereon. Where the restraining member is clipped to the drawer by pins, for pivoting or for stopping pivot movement of the member, it is preferably additionally supported on the drawer so that the reaction forces during flexure for unclipping are not reacted by the pins.

To help understanding of the invention, first and second specific embodiments thereof will now be described with reference to the accompanying drawings in which:

FIRST EMBODIMENT

Figure 1:
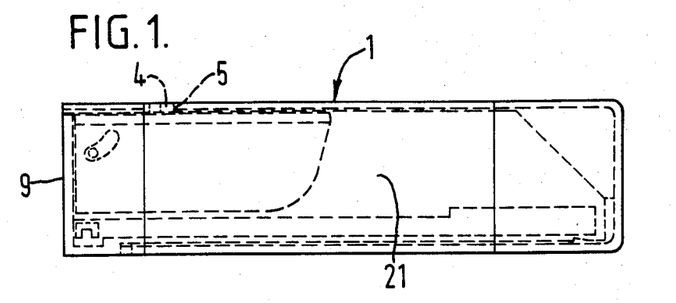
FIG. 1 is a side view of a box of the first embodiment of the invention.
Figure 2:
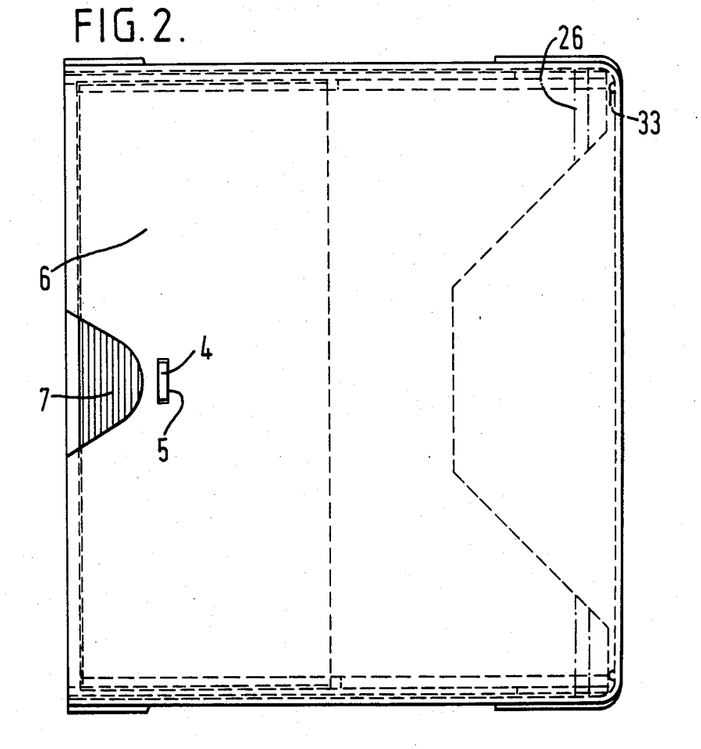
FIG. 2 is a plan view of the box of FIG. 1.
Figure 3:
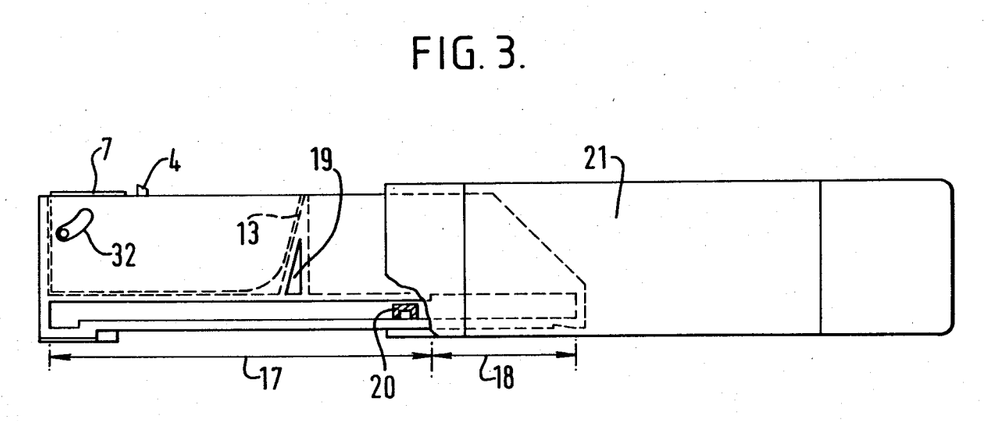
FIG. 3 is a side view with a drawer of the box of FIG. 1 partially drawn from its sleeve.
Figure 4:
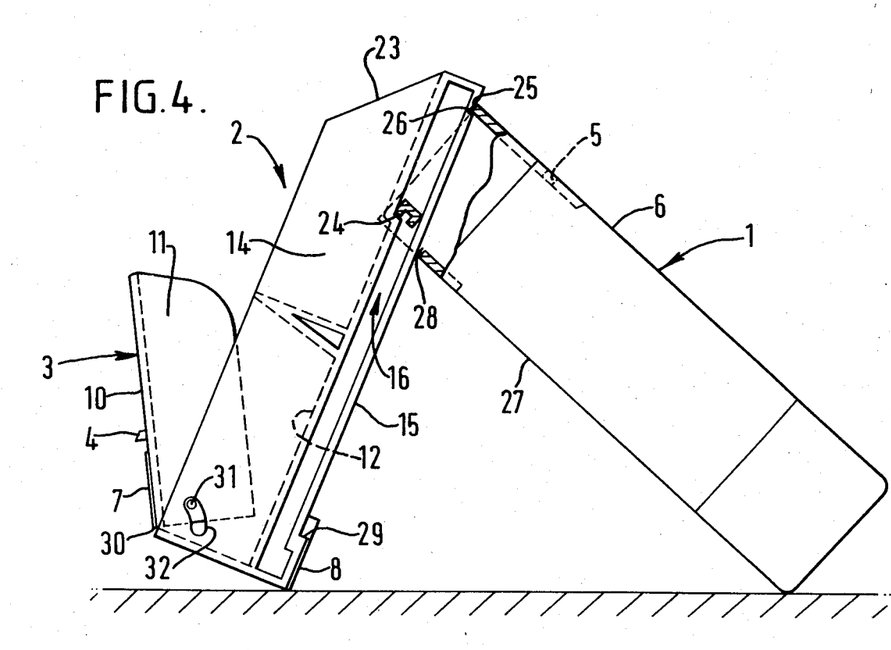
FIG. 4 is a side view with the drawer fully withdrawn swung and moved back until the box of FIG. 1 has become self supporting.
Figure 5:
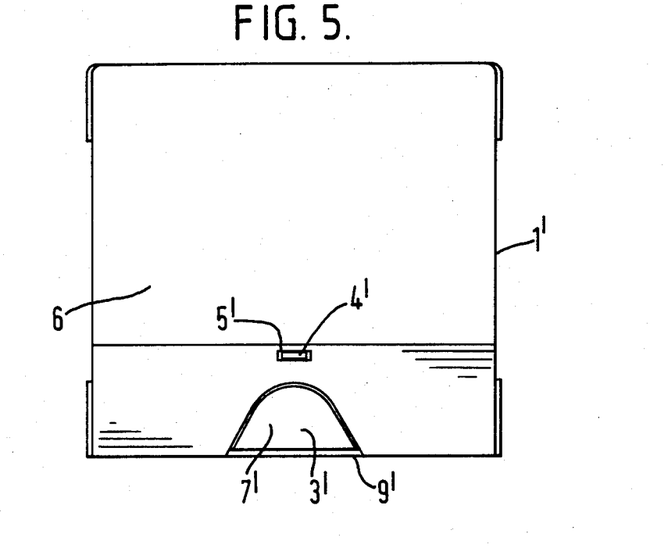
FIG. 5 is a top view of a box of the second embodiment of the invention.
Figure 6:
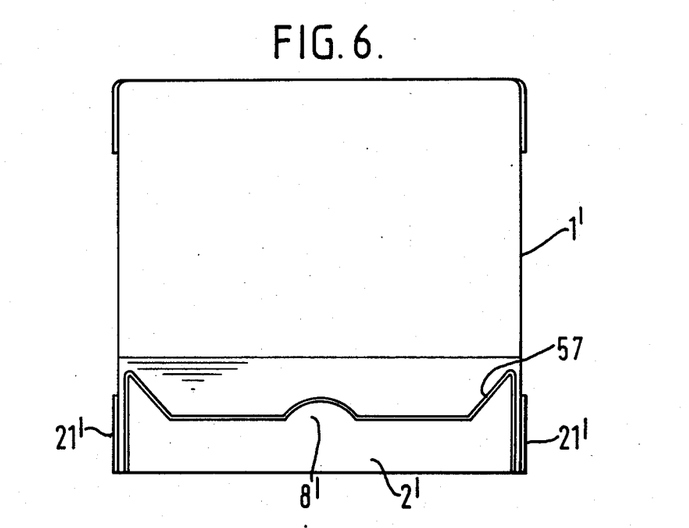
FIG. 6 is a bottom view of the box of FIG. 5.

Referring first to FIGS. 1 to 4 and to in particular FIG. 4, the box can be seen to consist of a sleeve 1, a drawer 2 and a restraining member 3, all three of moulded polystyrene or ABS plastics material. FIGS. 1 and 2 show the drawer 2 contained within the sleeve 1 when the box is closed. A detent 4 on the restraining member 3 engages in an aperture 5 in the top 6 of the sleeve for holding the box closed. In this position the inner end of the drawer abuts a pair of abutments 33 in the sleeve whereby the sleeve is firmly located.

For opening of the box it is gripped and squeezed at grips 7, 8 provided opposite each other on the restraining member 3 and on the base of the drawer 2, the top and bottom members of the sleeve having cut-outs complementary to the grips. The drawer is effectively unbendable under this squeezing, having a reinforcing flat front face 9. However, the restraining member comprises an unreinforced web 10 extending from side to side of the drawer. This web 10 bends to release the detent 4 from the aperture 5 and to allow the drawer 2 to be withdrawn from the sleeve 1. The restraining member has opposite side members 11 which abut ledges 12 to react the gripping force. Front and back edges of the side members 11 are captive between the front fact 9 and ridges 13 on the drawer, see FIG. 3, whereby sliding forces on the restraining member 3 at the grip 7 are transmitted to the drawer.

The drawer 2 has side members 14, between which the restraining member sides 11 are accommodated, and a base member 15. The side members 14 are grooved on their outer surfaces with grooves 16 having a front "drawing-only" portion 17 and a rear "drawing and moving back" portion 18, the latter portion being wider. (The very front end of portion 17 is also wider but this is merely a moulding detail to maintain wall thickness constant; recesses 19 opposite ridges 13 are provided for the same reason.)

A pair of squat U-shape pins 20 are moulded on the insides of side members 21 of the sleeve 1. The pins 20 engage in the grooves 16, and retain the drawer attached to the sleeve, the grooves 16 stopping short of the inner ends of the side members 14. For initial engagement of the pins 20 in the grooves 16, the front ends of the sleeve side members 21 can be sprung out slightly, a cut-out 28 in the bottom member of the drawer facilitates this. The pins 20 have a greater length in the direction of withdrawal of the drawer than height transverse to this direction. This uneven aspect ratio will now be explained.

During initial withdrawal the pins 20 are accommodated in the "drawing-only" portion 17 of the grooves 16. When the drawer has been fully withdrawn, or at least so far that the angled inner end 23 of the drawer sides 14 can clear the top 6 of the sleeve, the pins 20 are able to turn in the wider portion 18 of the grooves 16. Thus the drawer 2 and sleeve 1 can be swung about the pins 20 until they are at the angle shown in FIG. 4 when the drawer can be moved back until the pins come to rest on stops 24 formed where groove portions 17 widen into portions 18.

In this invert-V position, the box is self-supporting with the base member 15 of the drawer resting on the front edge 25 of the sleeve top member 6, the bottom member being indented to mate within the edge—see chain dotted lines 26 in FIG. 2. The bottom 27 of the sleeve is cut away at 28 to accommodate the drawer. To fill the cut-out 28 when the box is closed, the base 15 of the drawer is stepped out at 29.

The restraining member 4 is free to pivot about the top edge 30 of the drawer front face 9 as far as the angle shown in FIG. 4, i.e. 10° to the vertical, at which angle pins 31 on the restraining member side members 11 abut the ends of curved slots 32 in the drawer sides 14 whereby floppy discs supported in the drawer are restrained from falling forwards out of the drawer when they are being leafed through for selection.

SECOND EMBODIMENT

The box of the second embodiment shown in FIGS. 5 to 10 of the drawings is generally similar to the box of the first embodiment. The features which are similar have the same numerals followed by an apostrophe. The features which are different have reference numerals 51 upwards. The box consists of a sleeve 1', a drawer 2' and a restraining member 3'. A detent 4' on the restraining member 3' engages in an aperture 5' in the top 6' of the sleeve for holding the box closed.

For opening of the box it is gripped and squeezed at grips 7', 8' provided opposite each other on the restraining member 3' and on the base of the drawer 2', the top and bottom members of the sleeve having cut-outs complementary to the grips. The back edge of each side member 11' of the restraining member 3' abuts a respective ridge 13' on the drawer and the front edge of the web 10' abuts the inner surface of the face 9' until the web 10' is moved to its restraining position (see below), whereby sliding forces on the restraining member 3' at the grip 7' are transmitted to the drawer.

Figure 10:
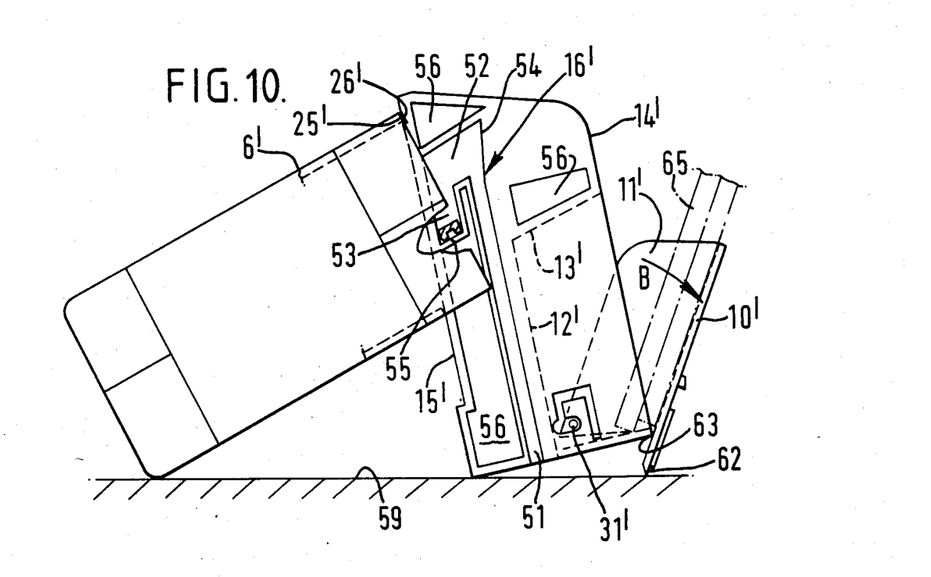
FIG. 10 is a further similar view showing the box of FIG. 5 self-supporting on a surface.

The drawer 2' has side members 14', between which the restraining member sides 11' are accommodated, and a base member 15'. The side members 14' are grooved on their outer surfaces with grooves 16'. As best shown in FIG. 10, the grooves 16' are hook-shaped, each having a long branch 51, a transverse connecting section 52 and a short branch 53. The front end of the long branch is open at the flat front face 9' of the drawer. However, when the box is closed, a respective one of a pair of squat U-shape pins 20' moulded on the insides of the side members 21' of the sleeve 1' closes each long branch 51 at the front face 9', the pins 20' being provided at the front edges of the side membes 21'. The long branches 51 extend back along substantially the entire length of the side members 14' of the drawer 2' and have upwardly tapering rear end sections 54. Extending downwards and slightly forwards from the sections 54 are transverse connecting sections 52 leading to forwardly extending short branches 53 arranged below the long branches 51. The forward end 55 of the short branches is angled as will be explained below. The sides 14' of the grooves are provided with recesses 56 for maintaining the wall thickness constant.

As mentioned, the pins 20' engage in the grooves 16' and retain the drawer 2' attached to the sleeve 1'. For initial engagement of the pins 20' in the grooves 16' the forward ends of the sleeve side members 21' can be flexed outwards. This is facilitated by the provision of angled cut-outs 57 (see FIG. 6) in the bottom of the sleeve, which leave triangular portions of the sides 21' unreinforced and hence sufficiently flexible for springing of the pins 20' into the grooves 16'.

Figure 7:
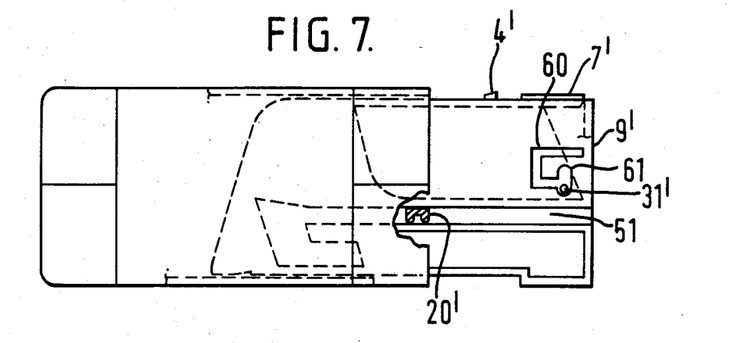
FIG. 7 is a side view showing the box of FIG. 5 during drawing of its drawer.
Figure 8:
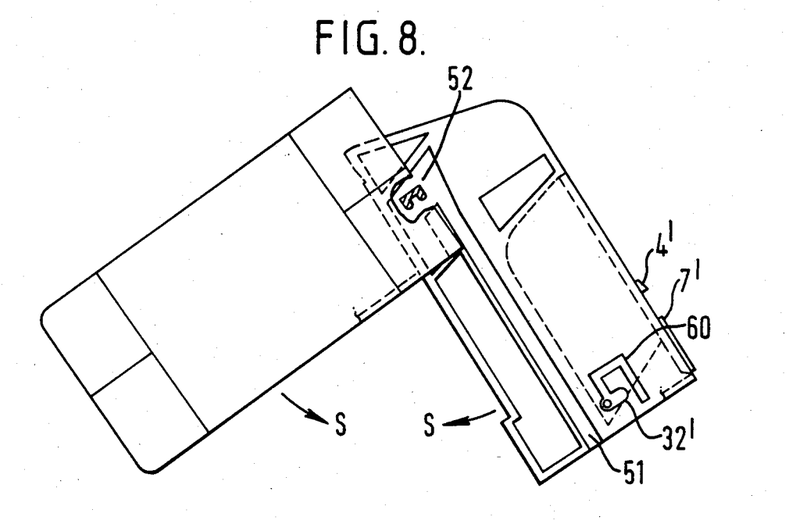
FIG. 8 is a view similar to FIG. 7 showing swinging of the drawer and the sleeve of the box with respect to each other.
Figure 9:
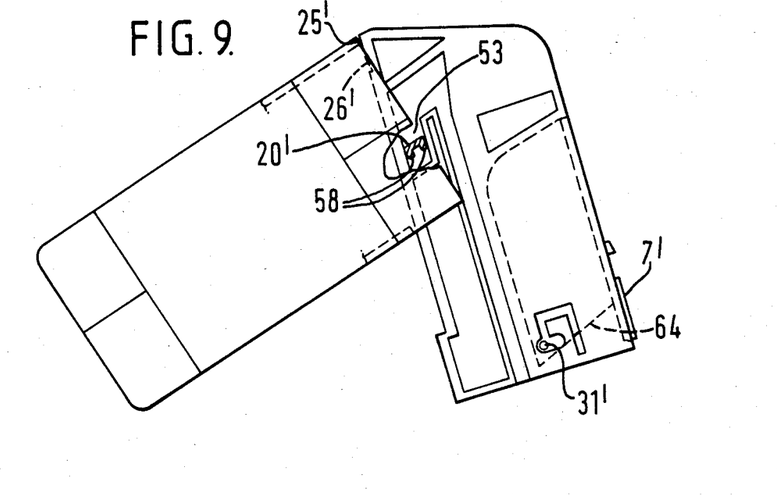
FIG. 9 is another similar view showing moving back of the drawer.

On initial drawing of the drawer 2' from the sleeve, see FIG. 7, the pins 20' pass along the long branches 51 of the grooves 16'. On reaching the rear end of the grooves, the pins 20' are accommodated in the transverse connecting sections 52. The sleeve 1' and the drawer 2' are then angularly swung in the direction of the arrows S in FIG. 8. If the swinging action is started before the drawing action is complete, the long diagonal dimension across the pins 20° is accommodated across the long branches 51 by the tapering sections 54. The swinging action is accompanied by a transverse movement of the sleeve and drawer so that the pins align with the short branches 53 of the grooves 16'. Then, as shown in FIG. 9, the drawer is moved back on itself with the pins 20' passing along the short branches 53 until they abut their angled forward ends 55. These ends are so angled that the twin abutments 58 of each U-shaped pin 20' both abut the respective end 55. The box is then arranged for self-support on a surface 59, see FIG. 10. In this invert-V position the base member 15' of the drawer at a recess 26' mates with the front edge 25' of the sleeve top member 6'. The angle between the sleeve and the drawer is typically 74°.

Once the box is open, the restraining member 3' can be opened to its restraining position as also shown in FIG. 10. It has pins 31' moulded integrally with the restraining member side members 11'. The pins are accommodated in slots 32' in the drawer side members 14'. The slots 32' extend transversely of the drawers' length. A U-shaped aperture 60 extends—from close to the bottom rear end of each slot—back, up and forwards over its slot 32' giving the slot a slight resilience in its width, whereby the pin 31' accommodated in it is frictionally held at least when at the "upper" end 61 of the slot 32'. As the restraining member 3' is opened by being moved away from the drawer in the direction of the arrow B, its forward end 62 which is angled will ride over the top front edge 63 of the drawer. As the restraining member is opened further, its pins 31' will move to the "upper" ends of the slots 32' where they are frictionally held. As the portion of the web 10' of the restraining member adjacent the forward edge 62 passes over the edge 63 it does so in an over-centre manner, with the slot 31' resiliently opening slightly and the web 10' flexing slightly. Then the forward end 62 passes under the edge 63 to abut the surface 59. The side members 11° are cut away at 64 to provide with the web 10' a corner location for the edge 63. This position of the restraining member is stable, whereby floppy discs 65 leant against the restraining member, as shown in dotted outline in FIG. 6, do not over-balance forwards the entire box.

Closure of the box is effected reversing the steps described above.

The invention is not intended to be restricted to the details of the above described embodiments. The position of the pins and grooves in the second embodiment could be altered up or down, but their position spaced from both top and bottom members of the sleeve is found to give a good compromise between clearance for sliding and stability.

I claim:
1. A box for holding thin objects, comprising:
   (A) a sleeve, including two opposite side members, a top member and a bottom member, each member having a terminating end defining an open end of the sleeve;
   (B) a drawer, including two opposite side members and a bottom member, the side members of the sleeve and the side members of the drawer being arranged in two adjacent pairs of one sleeve side member and one drawer side member per pair; and
   (C) engagement means for interconnecting the drawer and the sleeve so as to allow the drawer to be moved from a first closed position wherein the drawer is substantially enclosed by the sleeve, to a second position wherein the drawer is partially withdrawn from the sleeve, to a third position wherein the drawer is swung through an angle of less than 180 degrees with respect to the sleeve, to a fourth self-supporting open posititon; wherein the engagement means comprises:

(1) a respective pin fixedly attached to a side member of each pair of side members so as to be positioned between the corresponding pair of side members, and (2) a respective groove extending in a corresponding side member of the pair of side members for co-operating with a respective one of said pins to interconnect the drawer and the sleeve, each groove having a first elongated portion for guiding at least part of the drawer's travel between the first and second positions, and each groove having a second portion connected to the first groove portion, the second portion having at least first and second terminating ends, the first end defining a first stop to prevent further withdrawal of the drawer from the sleeve by abutment of a corresponding pin against the first stop, and the second end defining a second stop to prevent the drawer from further movement beyond the fourth position when the drawer is in the third, swung, position, the second portion of the groove having a width transverse to its longitudinal length that is greater than the maximum cross-sectional dimension of the respective pin so as to allow the drawer, when in at least the second position, to be swung with respect to the sleeve into the third position, and to further allow the drawer, when in the third position, to be moved in the second portion of the groove in a direction away from the first terminating end until the respective pin contacts the second stop defined by the second terminating end of the second groove portion, said movement of the drawer such that the bottom member of the drawer abuts at least one terminating end of the members forming the sleeve and defining a relative inclination of the drawer with the sleeve in which the box is self-supporting, thereby positioning the drawer in the fourth self-supporting position;

whereby the drawer is partially withdrawable from the sleeve, and from there the drawer and sleeve can be swung with respect to each other through an angle of less than 180 degrees while still interengaged, and the drawer can then be moved into the fourth position wherein the pins abut the respective second ends of each second groove portion to stop further movement of the drawer away from the first end and, together with an engagement of the bottom member of the drawer with at least one terminating end of the members forming the sleeve, defining a relative inclination of the drawer with the sleeve in which the box is self-supporting in its fourth open position.

2. A box for holding thin objects as defined in claim 1 wherein the second stop of each groove second portion is positioned within the side member of the pair of side members so that when the pins abut the second stops, the terminating edge of the sleeve top member is in the neighborhood of a rear edge of the drawer bottom member; and the box is self-supporting on a front bottom edge of the drawer and a rear bottom edge of the sleeve.

3. A box for holding thin objects as defined in claim 2, wherein:

(1) each pin is provided on the inside of its respective sleeve side member; and (2) each groove extends along its respective drawer side member.

4. A box for holding thin objects as defined in claim 2, wherein said engagement means provides a pivotal interconnection of said sleeve and said drawer, such that said swinging movement is a simple pivotal movement.

5. A box for holding thin objects as defined in claim 2, wherein each groove second portion is wider than the respective pin so that the engagement means provides a pivotal connection such that said swinging movement is a pivotal movement accompanied by a movement transverse to the grooves.

6. A box for holding thin objects as defined in claim 2, wherein said box is fabricated from molded plastic material, the pins are integrally molded on the inside of the respective sleeve side members and the grooves are integrally molded in the outside surface of the respective drawer side members.

7. A box for holding thin objects as defined in claim 6, wherein the bottom member of the sleeve is recessed in the region of the pins to enable the sleeve side members to deflect outwards on springing of the pins into the grooves in the side members for initial assembly of the box.

8. A box for holding thin objects as defined in claim 6, wherein the first portion of each groove has a width less than the width of the second groove portion and further wherein the pins have an aspect ratio such that they occupy substantially the full width of the groove first portion's width and further wherein the pins substantially occupy the full width of the second groove portion's width during movement of the drawer with respect to the sleeve between the third and fourth positions of the engagement means.

9. A box for holding thin objects as defined in claim 6, further wherein the first and second portions of the respective grooves are connected to form a step junction, said step junction forming the second stop to prevent the drawer from further movement beyond the fourth position.

10. A box for holding thin objects as defined in claim 6, wherein each groove in the respective drawer side members is hook-shaped, and has:

(1) a long branch defining the first groove portion that is occupied by its respective pin during withdrawal of the drawer from the sleeve between at least a portion of the first and second positions, (2) a transverse connecting section forming part of the second groove portion that is occupied by its pin during at least part of the swinging of the drawer with respect to the sleeve as the drawer is moved from its second position to the third position, and (3) a shorter branch substantially parallel to said long branch, the shorter branch forming part of the second groove portion, the shorter branch occupied by its pin during movement of the drawer from the third position to the fourth position.

11. A box for holding thin objects as defined in claim 10, wherein the short branches of the grooves are positioned on the drawer-bottom-side of the long branches.

12. A box for holding thin objects as defined in claim 10, wherein the shorter branches of the grooves are wider than the long branches and the pins have an aspect ratio such that they occupy substantially the full width of the long branches during withdrawing of the drawer through at least a portion of the first and second positions and the pins occupy substantially the full width of the shorter branches during movement of the drawer from the third position to the fourth position.

13. A box for holding thin objects as defined in claim 10, wherein the stops are formed by the ends of the short branches remote from the transverse connecting sections with which the pins cooperate to stop further movement of the drawer with respect to the sleeve as the drawer is moved from the third to the fourth positions.

14. A box for holding thin objects as defined in claim 10, wherein the long branch of each groove tapers away from the shorter branch in the region of the transverse connecting section.

15. A box for holding thin objects as defined in claim 6, wherein the pins are U-shaped.

16. A box for holding thin objects as defined in claim 1, wherein a recess is provided in the bottom member of the drawer to cooperate with the top member of the sleeve when the pins abut the second stop.

17. A box for holding thin objects as defined in claim 1, wherein:
   (1) each pin is provided on the inside of its respective sleeve side member; and
   (2) each groove extends along its respective drawer side member.

18. A box for holding thin objects as defined in claim 1, wherein said engagement means provides a pivotal interconnection of said sleeve and said drawer, such that said swinging movement is a simple pivotal movement.

19. A box for holding thin objects as defined in claim 1, wherein each groove second portion is wider than the respective pin so that the engagement means provides a pivotal connection such that said swinging movement is a pivotal movement accompanied by a movement transverse to the grooves.

20. A box for holding thin objects as defined in claim 1, wherein said box is fabricated from molded plastic material, the pins are integrally molded on the inside of the respective sleeve side members and the grooves are integrally molded in the outside surface of the respective drawer side members.

21. A box for holding thin objects as defined in claim 20, Wherein the bottom member of the sleeve is recessed in the region of the pins to enable the sleeve side members to deflect outwards on springing of the pins into the grooves in the side members for initial assembly of the box.

22. A box for holding thin objects as defined in claim 21, wherein the first portion of each groove has a width less than the width of the second groove portion and further wherein the pins have an aspect ratio such that they occupy substantially the full width of the groove first portion's width and further wherein the pins substantially occupy the full width of the second groove portion's width during movement of the drawer with respect to the sleeve between the third and fourth positions of the engagement means.

23. A box for holding thin objects as defined in claim 20, further wherein the first and second portions of the respective grooves are connected to form a step junction, said step junction forming the second stop to prevent the drawer from further movement beyond the fourth position.

24. A box for holding thin objects as defined in claim 20, wherein each groove in the respective drawer side members is hook-shaped, and has:
   (1) a long branch defining the first groove portion that is occupied by its respective pin during withdrawal of the drawer from the sleeve between at least a portion of the first and second positions,
   (2) a transverse connecting section forming part of the second groove portion that is occupied by its pin during at least part of the swinging of the drawer with respect to the sleeve as the drawer is moved from its second position to the third position, and
   (3) a shorter branch substantially parallel to said long branch, the shorter branch forming part of the second groove portion, the shorter branch occupied by its pin during movement of the drawer from the third position to the fourth position.

25. A box for holding thin objects as defined in claim 24, wherein the short branches of the grooves are positioned on the drawer-bottom-side of the long branches.

26. A box for holding thin objects as defined in claim 24, wherein the shorter branches of the grooves are wider than the long branches and the pins have an aspect ratio such that they occupy substantially the full width of the long branches during withdrawing of the drawer through at least a portion of the first and second positions and the pins occupy substantially the full width of the shorter branches during movement of the drawer from the third position to the fourth position.

27. A box for holding thin objects as defined in claim 24, wherein the stops are formed by the ends of the short branches remote from the transverse connecting sections with which the pins cooperate to stop further movement of the drawer with respect to the sleeve as the drawer is moved from the third to the fourth positions.

28. A box for holding thin objects as defined in claim 24, wherein the long branch of each groove tapers away from the shorter branch in the region of the transverse connecting section.

29. A box for holding thin objects as defined in claim 20, wherein the pins are U-shaped.

30. A box for holding thin objects as defined in claim 1, further including:
   (1) a restraining member connected to the drawer for restraining said objects from falling out of the box when the box is stood on a flat surface in its fourth, open, position,
   (2) connection means for pivotally connecting the restraining member to the drawer about an axis at or adjacent a top front edge of the drawer, and
   (3) abutment means for limiting forward pivotal movement of the restraining member in its restraining position by abutment between the restraining member and the drawer.

31. A box for holding thin objects as defined in claim 30, wherein the restraining member is pivotally connected to the drawer so that in the member's restraining position a forward edge of the restraining member abuts said flat surface.

32. A box for holding thin objects as defined in claim 31, wherein the restraining member includes a web having a forward edge that cooperates with the top front edge of the drawer in an over-center manner and the axis of pivotal connection of the restraining member to the drawer deflects during movement of the restraining member from a position partially closing the drawer when the box is closed to its surface abutting/restraining position.

33. A box for holding thin objects as defined in claim 30, wherein said restraining member comprises:
(1) a web; and
(2) side members extending from said web inwardly of said drawer adjacent the drawer side members; and said connection means comprises:
(3) a respective pin provided on the outside of each side of the restraining member, and
(4) a respective slot in each side member of the drawer, a respective one of the restraining member pins being engaged in each drawer side member slot.

34. A box for holding thin objects as defined in claim 33, wherein the abutment means comprises the restraining member pins and an end of each drawer side member slots, said slots being arcuate about the top front edge of the drawer and the restraining member pivoting about the drawer top front edge.

35. A box for holding thin objects as defined in claim 33, wherein said abutment means comprises a respective forward edge of each side member of the restraining member and an inside surface of a front member of the drawer.

36. A box for holding thin objects as defined in claim 35, wherein the restraining member comprises means so that when in the member's restraining position a forward edge of the restraining member abuts said flat surface and wherein the drawer side slots extend transversely of the length of said side members of said drawer.

37. A box for holding thin objects as defined in claim 36, wherein an upper end of each drawer side member slot is resilient.

38. A box for holding thin objects as defined in claim 30, wherein the sleeve top member includes an aperture dimensioned for receipt of a detent and wherein the restraining member is resilient and includes a detent that engages in the aperture in the sleeve top member for holding the box closed when in the first position, the retraining member being flexed for disengagement of the detent from the aperture and for opening the box.

39. A box for holding thin objects as defined in claim 38, wherein the drawer side members each include a slot and wherein the restraining member includes a web and side members extending from said web inwardly of the adjacent drawer side members, each side member of the restraining member having a pin engaged in a respective slot in the respective drawer side member for pivotal connection of the restraining member to the drawer and further wherein the restraining member side members abut the drawer on flexure of the detent for opening of the box.

* * * * *